(12) United States Patent
Brotto

(10) Patent No.: US 10,369,670 B2
(45) Date of Patent: Aug. 6, 2019

(54) MAGNETIC DRILL PRESS WITH ALTERNATE POWER SOURCE

(71) Applicant: Black & Decker Inc., New Britain, CT (US)

(72) Inventor: Daniele C. Brotto, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 16/149,923

(22) Filed: Oct. 2, 2018

(65) Prior Publication Data

US 2019/0030667 A1  Jan. 31, 2019

Related U.S. Application Data

(60) Division of application No. 15/397,366, filed on Jan. 3, 2017, now Pat. No. 10,118,265, which is a continuation of application No. 14/262,085, filed on Apr. 25, 2014, now Pat. No. 9,561,568.

(51) Int. Cl.
*B23Q 3/154* (2006.01)
*B23B 39/14* (2006.01)
*B25H 1/00* (2006.01)

(52) U.S. Cl.
CPC ............ *B23Q 3/1543* (2013.01); *B23B 39/14* (2013.01); *B25H 1/0071* (2013.01); *B23B 2260/024* (2013.01); *B23B 2260/062* (2013.01); *B23B 2270/32* (2013.01)

(58) Field of Classification Search
CPC ........ B23B 2260/024; B23B 2260/062; B23B 39/14; B23Q 3/1543; B25H 1/0071
See application file for complete search history.

(56) References Cited

U.S. PATENT DOCUMENTS

| | | |
|---|---|---|
| 919,597 A | 4/1909 | Klouse et al. |
| 983,083 A | 1/1911 | Pealing |
| 1,946,214 A | 2/1934 | Kabigting |

(Continued)

FOREIGN PATENT DOCUMENTS

| | | |
|---|---|---|
| EP | 1967305 A1 | 9/2008 |
| EP | 2127790 A1 | 12/2009 |
| GB | 2241618 A | 9/1991 |

OTHER PUBLICATIONS

U.S. Appl. No. 15/397,366, filed Jan. 3, 2017.
U.S. Appl. No. 15/397,366, filed Jan. 3, 2017, Brotto.

*Primary Examiner* — Muhammad S Islam
(74) *Attorney, Agent, or Firm* — Michael Aronoff

(57) ABSTRACT

A magnetic drill is provided with an alternate power source. The drill is comprises of: an electric motor for driving a tool; a controller configured to receive an AC input signal and operable to control a drive signal to the electric motor; an electromagnet arranged in a base of the drill housing and operable, in response to a DC voltage, to magnetically couple the base to a surface proximate to the base; an AC/DC converter configured to receive the AC input signal and operates, independent from the controller and in the presence of the AC input signal, to output a DC voltage to the electromagnet; and an alternate power source circuit that monitors the DC voltage output by the converter and, in the absence thereof, provides an alternate DC voltage to the electromagnet.

15 Claims, 6 Drawing Sheets

(56) References Cited

U.S. PATENT DOCUMENTS

| | | |
|---|---|---|
| 2,472,270 A | 6/1949 | Stinchcomb |
| 2,622,457 A | 12/1952 | Buck |
| D170,352 S | 9/1953 | Buck |
| 2,672,770 A | 3/1954 | Buck |
| RE24,203 E | 8/1956 | Buck |
| D180,640 S | 7/1957 | Buck |
| 2,820,377 A | 1/1958 | Buck |
| 2,821,875 A | 2/1958 | Buck |
| 2,863,338 A | 12/1958 | Stewart |
| 2,876,663 A | 3/1959 | Buck |
| 2,879,678 A | 3/1959 | Kaiser, Jr. |
| 2,887,910 A | 5/1959 | Williamson, Jr. |
| 2,887,911 A | 5/1959 | Bunting |
| 2,932,194 A | 4/1960 | Buck |
| 2,938,411 A | 5/1960 | Herfurth |
| 2,955,491 A | 10/1960 | Buck |
| 2,977,825 A | 4/1961 | Buck |
| 3,044,321 A | 7/1962 | Buck |
| 3,044,324 A | 7/1962 | Buck |
| 3,159,061 A | 12/1964 | Walker et al. |
| RE26,037 E | 6/1966 | Herfurth |
| 3,254,547 A | 6/1966 | Engelsted et al. |
| 3,261,235 A | 7/1966 | Henkel |
| 3,342,089 A | 9/1967 | Palm |
| 3,371,257 A | 2/1968 | Warren et al. |
| 3,387,509 A | 6/1968 | Lupear |
| 3,596,558 A | 8/1971 | Rydell |
| 3,623,823 A | 11/1971 | Val |
| 3,677,656 A | 7/1972 | Buck |
| 3,700,195 A | 10/1972 | Pahlow |
| 3,728,027 A | 4/1973 | Watanabe |
| 3,791,755 A | 2/1974 | Warren |
| 3,796,506 A | 3/1974 | Buck |
| 3,904,159 A | 9/1975 | Pahlow |
| 3,969,036 A | 7/1976 | Hougen |
| 4,012,162 A | 3/1977 | Warren |
| 4,047,827 A | 9/1977 | Hougen |
| RE30,519 E | 2/1981 | Hougen |
| 4,261,673 A | 4/1981 | Hougen |
| 4,278,371 A | 7/1981 | Meyer |
| D267,011 S | 11/1982 | Morris |
| 4,387,305 A | 6/1983 | DeViney et al. |
| 4,390,309 A | 6/1983 | Fangmann |
| 4,456,410 A | 6/1984 | Mikiya et al. |
| 4,541,759 A | 9/1985 | Miyoshi |
| 4,559,577 A | 12/1985 | Shoji et al. |
| 4,591,301 A | 5/1986 | Pelfrey |
| 4,604,006 A | 8/1986 | Shoji et al. |
| 4,610,580 A | 9/1986 | Palm |
| 4,639,170 A | 1/1987 | Palm |
| 4,664,565 A | 5/1987 | Palm |
| D290,463 S | 6/1987 | Pelfrey et al. |
| 4,687,385 A | 8/1987 | Palm |
| 4,780,654 A | 10/1988 | Shoji et al. |
| RE33,145 E | 1/1990 | Palm |
| 4,892,447 A | 1/1990 | Schmidt |
| 5,007,776 A | 4/1991 | Shoji |
| 5,035,547 A | 7/1991 | Shoji |
| 5,035,549 A | 7/1991 | Asano et al. |
| 5,062,743 A | 11/1991 | Wieland et al. |
| 5,087,157 A | 2/1992 | Shoji et al. |
| 5,096,339 A | 3/1992 | Shoji |
| 5,126,643 A | 6/1992 | French |
| D329,438 S | 9/1992 | Asano et al. |
| 5,174,690 A | 12/1992 | Targett et al. |
| 5,275,514 A | 1/1994 | Johnson |
| D344,438 S | 2/1994 | Wood |
| 5,282,704 A | 2/1994 | Screen |
| D348,074 S | 6/1994 | Asano |
| 5,331,269 A | 7/1994 | Armond et al. |
| 5,415,503 A | 5/1995 | Strange et al. |
| 5,747,762 A | 5/1998 | Fukuda et al. |
| 5,902,076 A | 5/1999 | Miller et al. |
| 6,072,675 A | 6/2000 | Murakami et al. |
| 6,102,633 A | 8/2000 | Uehlein-Proctor |
| 6,236,177 B1 | 5/2001 | Zick et al. |
| D445,808 S | 7/2001 | Gill |
| D446,227 S | 8/2001 | Gill |
| 6,280,123 B1 | 8/2001 | Gill |
| D447,494 S | 9/2001 | Miller |
| D459,372 S | 6/2002 | Asano |
| D470,867 S | 2/2003 | Welsh |
| D470,868 S | 2/2003 | Welsh |
| D472,251 S | 3/2003 | Shimada |
| 6,974,284 B2 | 12/2005 | Omi |
| 7,001,117 B2 | 2/2006 | Mikiya et al. |
| 7,121,773 B2 | 10/2006 | Mikiya et al. |
| D559,284 S | 1/2008 | Albinsson et al. |
| D560,234 S | 1/2008 | Shimada |
| 7,396,194 B2 | 7/2008 | Jones, III |
| D577,750 S | 9/2008 | Kovach |
| 7,494,306 B2 | 2/2009 | Sihmada |
| D591,318 S | 4/2009 | Shimada |
| 7,862,267 B2 | 1/2011 | Shimada |
| 7,936,142 B2 | 5/2011 | Otsuka et al. |
| 8,118,521 B2 | 2/2012 | Lay et al. |
| 8,267,188 B2 | 9/2012 | Nicholson |
| 8,376,667 B2 | 2/2013 | Wilbert et al. |
| D681,080 S | 4/2013 | Wang |
| 2004/0217721 A1 | 11/2004 | Brotto |
| 2004/0223820 A1 | 11/2004 | Shieh |
| 2007/0144310 A1 | 6/2007 | Pozgay et al. |
| 2009/0028653 A1* | 1/2009 | Wilbert .......... B25H 1/0071 408/76 |
| 2009/0196696 A1 | 8/2009 | Otsuka et al. |
| 2010/0021249 A1 | 1/2010 | Beichter |
| 2010/0028093 A1 | 2/2010 | Otsuka |
| 2010/0219689 A1 | 9/2010 | Evertz |
| 2010/0290847 A1 | 11/2010 | Beichter et al. |
| 2012/0189382 A1 | 7/2012 | Health |
| 2012/0189392 A1 | 7/2012 | Golabiewski et al. |
| 2012/0294684 A1 | 11/2012 | Uriarte Mijangos et al. |
| 2013/0008678 A1 | 1/2013 | Nicholson |
| 2013/0108385 A1 | 5/2013 | Woelders |
| 2015/0251284 A1* | 9/2015 | Reichert .......... B23Q 3/1543 408/76 |

\* cited by examiner

MAGNETIC DRILL PRESS WITH ALTERNATE POWER SOURCE

CROSS-REFERENCE TO RELATED APPLICATIONS

This application is a division of U.S. patent application Ser. No. 15/397,366 filed on Jan. 3, 2017 which is a continuation of U.S. patent application Ser. No. 14/262,085 filed on Apr. 25, 2014 (now U.S. Pat. No. 9,561,568). The entire disclosures of the above applications are incorporated herein by reference.

FIELD

The present disclosure relates to a power tool and, more particularly, to magnetic drill presses.

BACKGROUND

Magnetic drill presses have bases which are designed to magnetically couple to a planar surface, such as a ferrous beam. In a typical situation, the base of the magnetic drill press is placed against a surface which will support the press during operation. When activated, an electromagnet, disposed in the base of the drill press, magnetically couples the drill press to the surface. A user will in turn initiate the drilling process using the drill press. At the completion of the drilling process, the electomagnet is deactivated, thereby enabling the user to reposition the drill press for subsequent use.

When the motor driving the drill press is de-energized, there can be considerable inertia remaining in the motor. In most instances, the motor is de-energized by the user while the drill press remains magnetically coupled to the support surface. In some instances, the AC power supplying the drill press and the electromagnet is removed unexpectedly, such as a circuit breaker overload or an inadvertent disconnection of the power cord. As a result, the electomagnet becomes de-energized and remaining motor inertia may cause the drill press to move. In these instances, it is common for the drill bits to be broken.

Therefore, it is desirable to provide an alternate power source for powering electromagnets used in various types of power tools. This section provides background information related to the present disclosure which is not necessarily prior art.

SUMMARY

This section provides a general summary of the disclosure, and is not a comprehensive disclosure of its full scope or all of its features.

A magnetic drill press is provided with an alternate power supply. The drill comprises: an electric motor for driving a tool accessory; a controller configured to receive an AC input voltage signal and operable to control a drive signal to the electric motor; an electromagnet arranged in a base of the drill housing and powered by a DC voltage, to magnetically couple the base to the surface; a AC/DC converter configured to receive the AC input signal and, independent from the controller and in the presence of the AC input signal, to output the DC voltage to the electromagnet; and an alternate power supply circuit that monitors the DC voltage output by the converter and, in the absence of the DC voltage, provides an alternate DC voltage to the electromagnet.

In some embodiments, the alternate power source circuit is further defined to include a battery and a detector that monitors the DC voltage output by the converter and electrically couples the battery to the electromagnet in the absence of a DC voltage output from the converter.

The detector of the alternate power source circuit may also include a first diode interposed between the converter and the electromagnet and a second diode having a cathode electrically coupled to a node interposed between the first diode and the electromagnet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
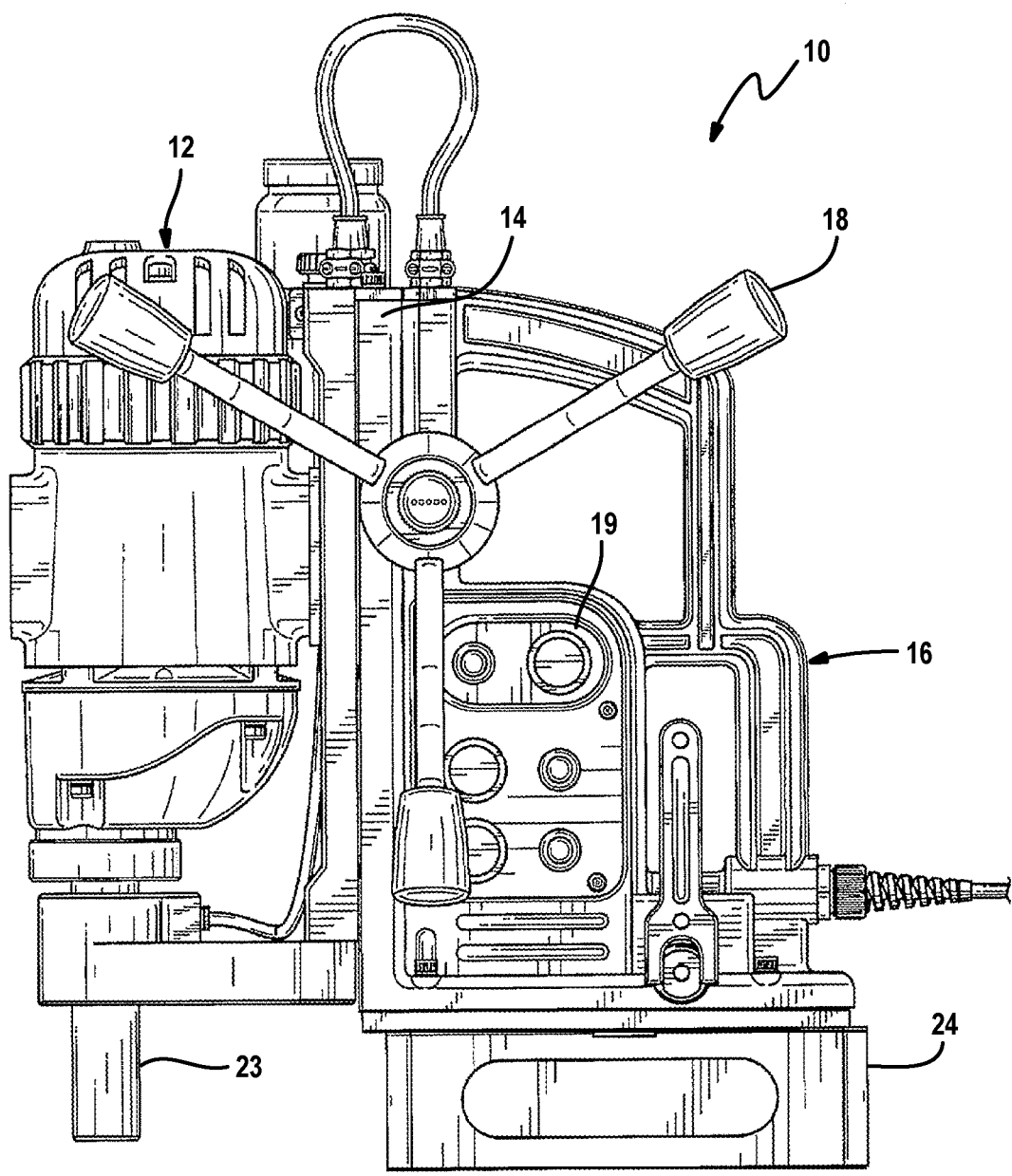
FIG. 1 is a side view of an example magnetic drill press including an electromagnet.

FIG. 1 illustrates an example magnetic drill press 10. The magnetic drill press 10 generally comprises a motor carriage 12 attached to a rack 14 of a housing 16. An electric motor, along with a drilling mechanism 23, is housed within the motor carriage 12. The electric motor 32 rotatably drives the drilling mechanism 23. In an example embodiment, the drilling mechanism is a tool bit holder 23 configured to hold an accessary, such as a drill bit. While reference is made throughout this disclosure to a drill press, it is readily understood that concepts described herein are applicable to other types of power tools which may make use of an electromagnetic attachment mechanism.

During operation, the tool operator moves the tool into engagement with a workpiece by moving the motor carriage 12 vertically up and down (in the orientation illustrated in FIG. 1) along the rack 14. More specifically, the tool operator may actuate a handle 18, which is interfaced with the rack 14, to move the motor carriage 12 toward and away from the workpiece. The housing 16 also supports multiple switches or buttons for controlling the operation of the tool, including a power on/off button 19 for coupling/decoupling current to the drill 10.

Figure 2:
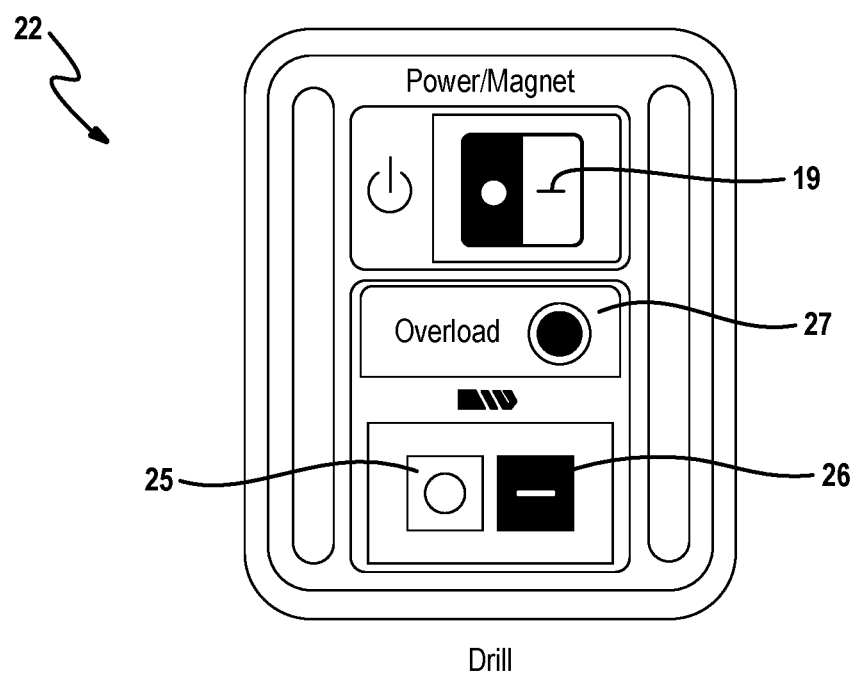
FIG. 2 is a diagram of an example operation panel for the magnetic drill press of FIG. 1.

An exemplary embodiment of an operation panel 22 for a magnetic drill press is shown in FIG. 2. In this embodiment, the power/magnet on/off button 19 is implemented as a rocker type switch. Power to the tool as a whole is enabled when the switch is placed in a first position and disabled when the switch is placed in a second position. In addition, in this exemplary embodiment, power is also supplied to the electromagnet 28 when the switch is in the first position and not supplied to the electromagnet 28 when the switch is in the second position Two interlinked push buttons (i.e., motor "off" button 25 and motor "on" button 26) may be used to turn on and off the motor driving the tool bit holder. The operation panel 22 may include other indicators of tool operation, for example an overload indicator 27. Other configurations for the operation panel 22 as well as other types of user interfaces for controlling the drill press are contemplated by this disclosure.

With continued reference to FIG. 1, the drill press 10 is further configured with a base 24 to secure the drill press 10 to a work surface. The base 24 houses an electromagnet 28. When the drill press is placed onto a work surface, the electromagnet 28 is positioned proximate thereto. In response to an energizing signal, the electromagnet 28 magnetically couples the base 28 of the drill press to the work surface. In an example embodiment, the drill press 10 uses a DC electromagnet although use of the more traditional AC electromagnet is also contemplated by this disclosure.

Figure 3:
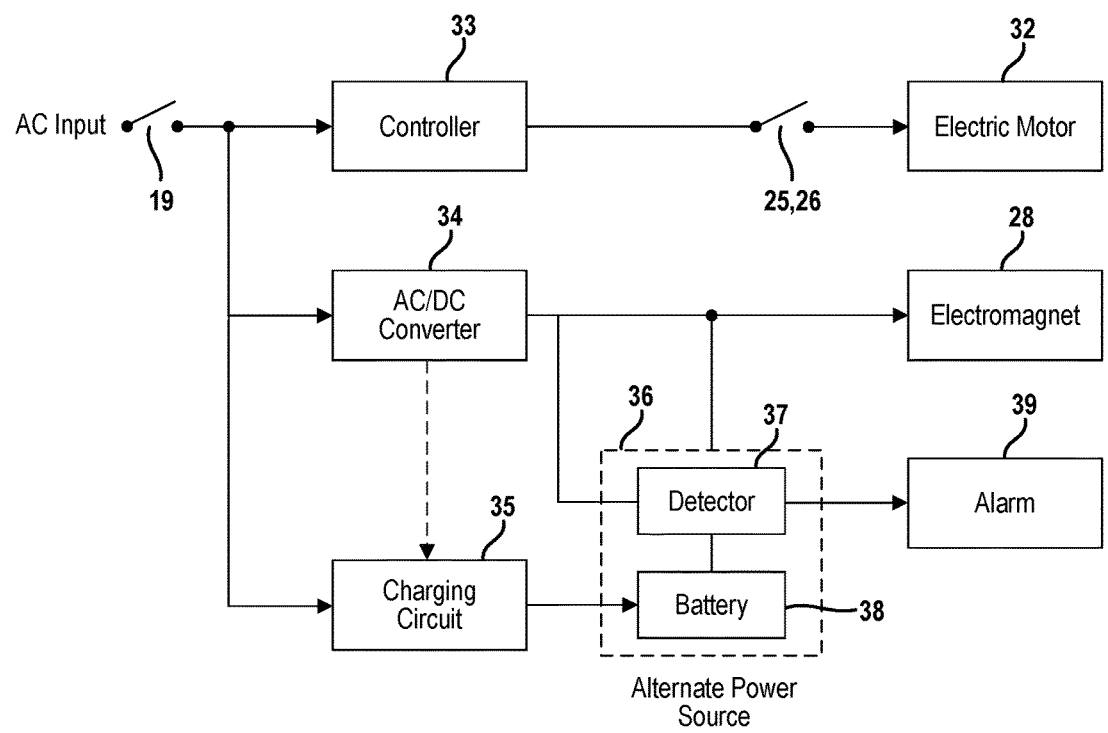
FIG. 3 is a block diagram of an example embodiment of the magnetic drill press of FIG. 1 having an alternate power source for the electromagnet.

FIG. 3 illustrates some of the internal components of the drill press 10. The drill press 10 includes an electric motor 32, a controller 33, an AC/DC converter 34, and an electromagnet 28. The drill press also includes an alternate power source 36. It is to be understood that only the relevant components of the drill press 10 are discussed in relation to FIG. 3, but that other components may be needed to manage and control the overall operation of the system.

The controller 33 controls the overall operation and function of the drill press 10. For example, the controller 33 outputs the drive signal to the electric motor 32. In the context of a corded power tool, the controller 33 is configured to receive an AC input voltage signal from an AC power source. In some embodiments, the AC input voltage signal may pass through a rectifier before serving as an input to the controller 33. In other embodiments, the primary power source for the drill may be a DC power source, such as a battery. As used herein, the term controller may refer to, be part of, or include an Application Specific Integrated Circuit (ASIC), an electronic circuit, a combinational logic circuit, a field programmable gate array (FPGA), a processor (shared, dedicated, or group) that executes code, a microcontroller or other suitable components that provide the described functionality.

When the drill press 10 is powered on, by placing switch 19 in the first position, the AC/DC converter 34 excites the electromagnet. That is, the AC/DC converter 34 receives the AC input voltage signal and operates, in the presence of the AC input voltage signal, to convert the AC input voltage signal to a DC voltage. The DC voltage is in turn output to the electromagnet 28. As noted above, the electromagnet 28 magnetically couples the drill press base to a metal surface in response to the applied DC voltage. To reposition the drill press, the tool operator turns off the electric motor (by depressing "off" button 25) and then powers down the tool (by placing switch 19 in the first position) which in turn deactivates the electromagnet.

In the event the AC power supply is unexpectedly interrupted, the alternate power source 36 is configured to supply an energizing signal to the electromagnet 28. In an example embodiment, the alternate power supply 36 includes a detector 37 and a battery 38. The detector 37 monitors the DC voltage output by the converter 34 and, in the absence of a DC voltage output from the converter 34, electrically couples the battery 38 to the electromagnet 28. The battery 38 may be non-chargeable or rechargeable having a chemistry, such as lithium, NiCd, NiMH, lead acid or the like. It is readily understood that other types of electrical power sources, such as supercapacitors, may be used in place of the battery 38.

In other embodiments, the detector 37 can monitor the presence of AC input signal directly at the input to the AC/DC converter 34 or indirectly by sensing the characteristic of the current consumed during operation of the electromagnet or the electromagnetic field generated by the electromagnet.

In some embodiments, the battery 38 may be rechargeable. In these instances, the drill press 10 may be further configured with a charging circuit 35. The charging circuit 35 receives either an AC or DC input signal and operates to maintain the charge of the battery 38. In this way, the alternate power source remains ready for use when called upon.

In more robust embodiments, the controller 33 and/or detector 37 can monitor health of the battery 38 and provide replacement information to the tool operator. For example, the controller can monitor the duration of time since the battery was installed and provide a notification to replace the battery when the duration exceeds a predefined limit. In another example, the controller can track the number of occurrences (or amount of time) when the battery 38 is used to energize the magnet and provide a notification to replace the battery when the number of occurrences or amount of time exceeds a predefined threshold. Similarly, notifications may be triggered when the columb-life or some other attribute indicative of battery "health" (e.g., low voltage) exceeds a predefined threshold. The notifications may take various forms including visual indicator, audible indicator, message on a display of the drill, text message sent to designated mobile phone, etc.

Figure 4:
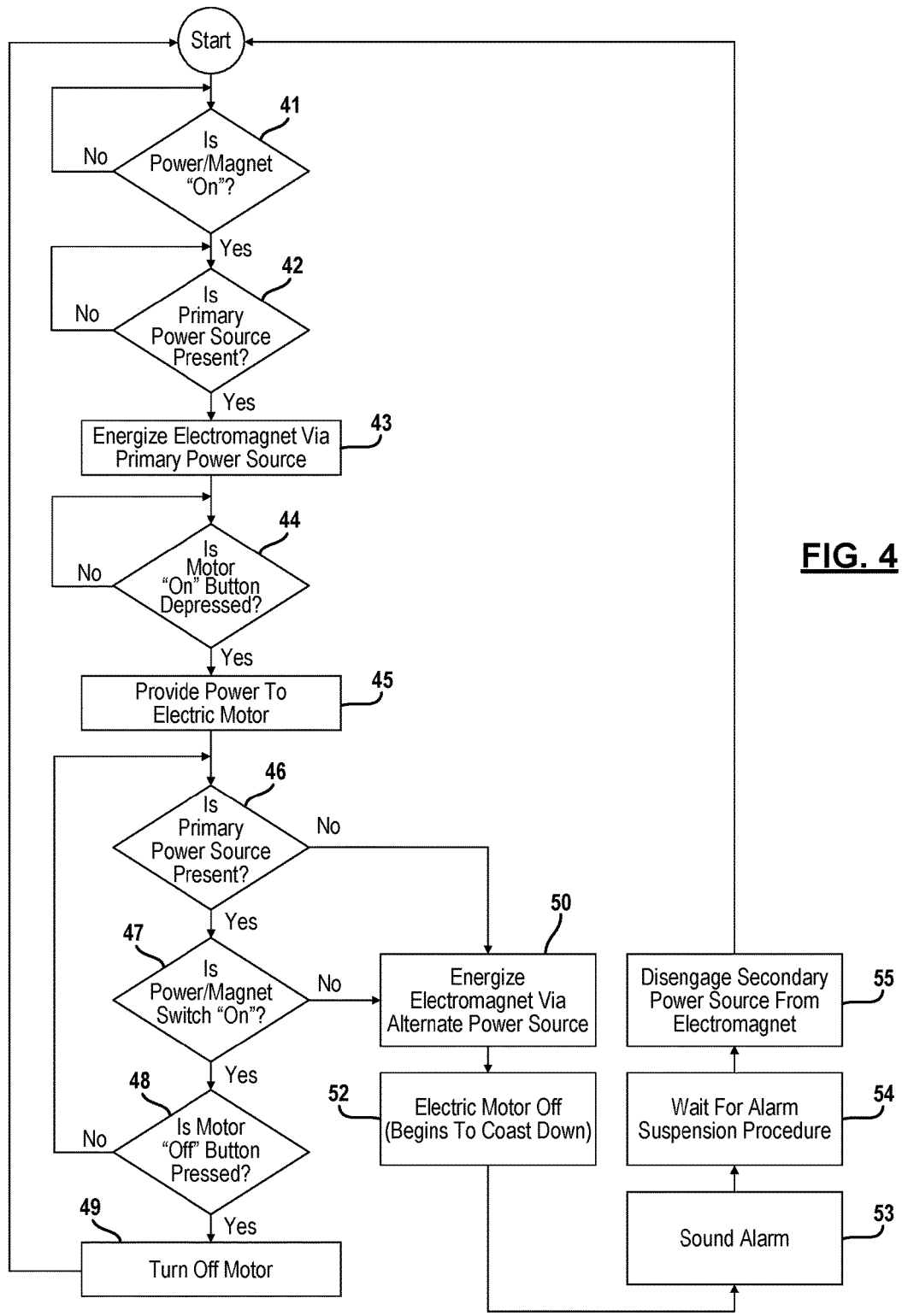
FIG. 4 is a flowchart illustrating the operational sequence of the drill press of FIG. 1.

FIG. 4 illustrates an exemplary operational sequence to implement the system described above. In step 41, the controller 33 determines if the power/magnet switch 19 is in the "on" position. If the power/magnet switch 19 is not in the "on" position the controller 33 continues to monitor the switch 19 until it is in the "on" position. When the switch 19 is in the "on" position then in step 42 the controller 33 determines if the primary power source (AC input voltage in this example) is present. If the primary power source is not present then the controller simply continues to monitor the AC input until the primary power source is present. If the primary power source is present and if the switch 19 is in the "on" position, an AC input signal will be present at the AC/DC converter 34 and then in step 43 the electromagnet 28 is energized by the primary power source.

While the power/magnet switch 19 remains in the "on" position, the drill determines at step 44 if the motor "on" button 26 is depressed. If the motor "on" button 26 is depressed then at step 45, the controller 33 provides power to the electric motor 32. If the motor "off" button is depressed, then the controller continues to monitor the motor "on" button 26 until it is depressed.

During drilling, the controller 33 continues to monitor the power/magnet switch 19, the motor on/off buttons 25, 26 and the presence of the primary power source. If the alternate power source 36 determines in step 46—by the absence of the DC voltage from the converter 34—that the primary power source is not present then in step 50 the electromagnet 28 is energized by the alternate power source 36. At step 52 the removal of the primary power source will remove power from the electric motor 32 thereby turning the electric motor 32 off. The electric motor 32 will coast to a stop but will still carry momentum which would tend to move the drill in an unsafe manner if the electromagnet 28 didn't maintain its attachment to the work surface. Steps 50 and 52 should occur at virtually the same time.

In some embodiments, the drill press 10 may generate an alert at 53 when the alternate power supply energizes the electromagnet 28. For example, the detector 37 may also electrically couple the battery 38 to an LED or another type of visual indicator. Alternatively or additionally, the detector 37 may electrically couple the battery to an audible alarm. In yet another example, the detector 37 may be configured to broadcast an alert, for example using a RF transmission, to a supervising device. Other types of alarms fall within the scope of this disclosure.

In one embodiment, the electromagnet remains energized until an input is received from the tool operator. For example, the power/magnet switch 19 is toggle to an off position or some other sequence of switch inputs. In other embodiments, the electromagnet 28 remains energized for a predefined period of time (e.g., 30 seconds or one minute). In any case, the electromagnet 28 is de-energized in response to a specified trigger condition as indicated at 55. Other types of triggers for de-energizing the electromagnet 28 are also contemplated by this disclosure.

If, in step 46, the primary power source is present then in step 47 the controller 33 determines if the power/magnet switch 19 is in the "on" position while the motor "on" button is still depressed. If the power/magnet switch 19 is "off" while the motor "on" button is depressed then the alternate power supply 36 determines—by the absence of the DC voltage from the converter 34—that the primary power source is not present while the electric motor 32 is still running and so in step 50 the electromagnet 28 is energized by the alternate power source 36. At step 52 the removal of the primary power source will remove power from the electric motor 32 thereby turning the electric motor 32 off. The electric motor 32 will coast to a stop but will still carry momentum which would tend to move the drill in an unsafe manner if the electromagnet 28 didn't maintain its attachment to the work surface. Again, steps 50 and 52 should occur at virtually the same time.

In response to the motor "off" button 25 being depressed at step 48, the controller 33 terminates power to the electric motor 32. In some embodiments, the electric motor 32 is not powered on when the on/off switch is actuated to the on position with the motor on button depressed, thereby preventing an inadvertent startup of the drill. Rather, the tool operator may be required to depress the motor "off" button 25 and then depress the motor "on" button 26 in order to power on the electric motor 32. This feature is commonly referred to as no-volt activation.

Figure 5:
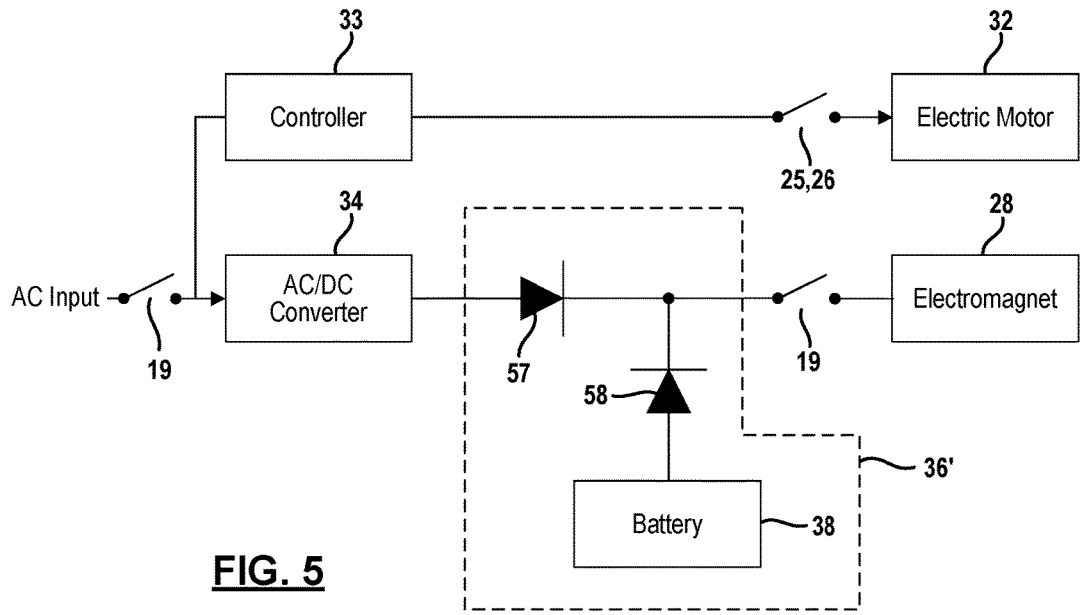
FIG. 5 is a schematic of an example embodiment of an alternate power supply circuit for use in the drill press of FIG. 1.

FIG. 5 further illustrates an example circuit implementation for the alternate power source 36'. In this example embodiment, the power/magnet on/off switch 19 is placed in the circuit path between the AC/DC converter 34 and the electromagnet 28. A first diode 57 is then interposed between the AC/DC converter 34 and the on/off switch 19. Placement of the on/off switch 19 in the circuit path may vary so long as it remains in series with the converter 34. Because the alternate power supply 36' is designed to operate independently from the controller 33, the switch 19 may be implemented as a double pole, single throw switch, where the other pole couples the AC power source to the controller 33. When the on/off switch 19 is closed, the first diode 57 is forward biased on and current flows into the electromagnet 28.

In this example embodiment, a second diode 58 serves as a detector that monitors the DC voltage output by the converter 34. The second diode 58 is electrically coupled to a node interposed between the first diode 57 and the on/off switch 19. When a DC voltage is output by the converter 34, the first diode 57 is forward biased; whereas, the second diode 44 is reverse biased. Conversely, when the DC voltage output by the AC/DC converter 34 is interrupted (i.e., absent), the first diode 57 is reverse biased and the second diode 58 is forward biased. That is, current flows from the battery 38 via the second diode 58 to the electromagnet 28. In this way, the electromagnet 28 remains active through the use of a passive component monitoring circuit when the AC power supply to the drill press is interrupted. Because of the placement of the on/off switch 19, it is noted that the alternate power source 36' operates to supply power to the electromagnet only when the drill press has been powered on using the on/off switch 19. Other implementations for the alternate power source are also contemplated within the broader aspects of this disclosure.

Figure 6:
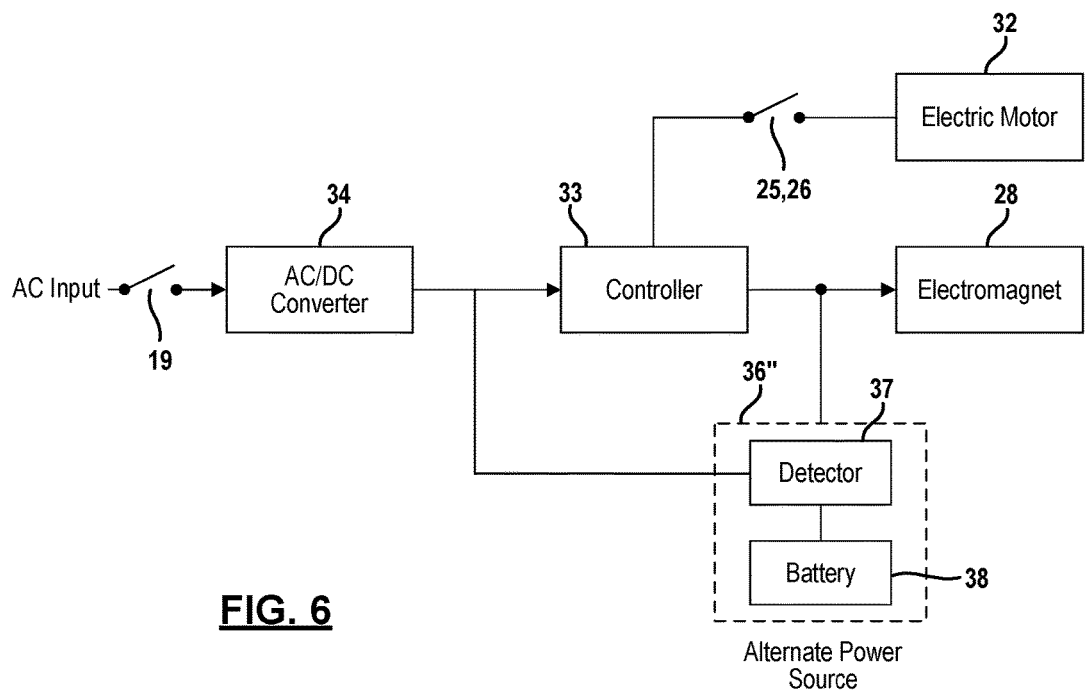
FIG. 6 is a block diagram of another example embodiment for a drill press.

FIG. 6 illustrates an alternative arrangement of components for the drill press. In this arrangement, the controller 33 is interposed between an AC/DC converter 34 and the electromagnet 28. The AC/DC converter 34 receives the AC input signal and in turn powers the controller 33. Rather than receiving the energizing signal from the AC/DC converter 34, the controller 33 delivers the energizing signal to the electromagnet 28, for example when the tool is powered on. The alternate power supply 36" monitors the energizing signal to the electromagnet 28 from the controller 33 and in the absence thereof provides an alternate DC voltage to the electromagnet 28. This arrangement otherwise operates in the manner as set forth above.

Figure 7:
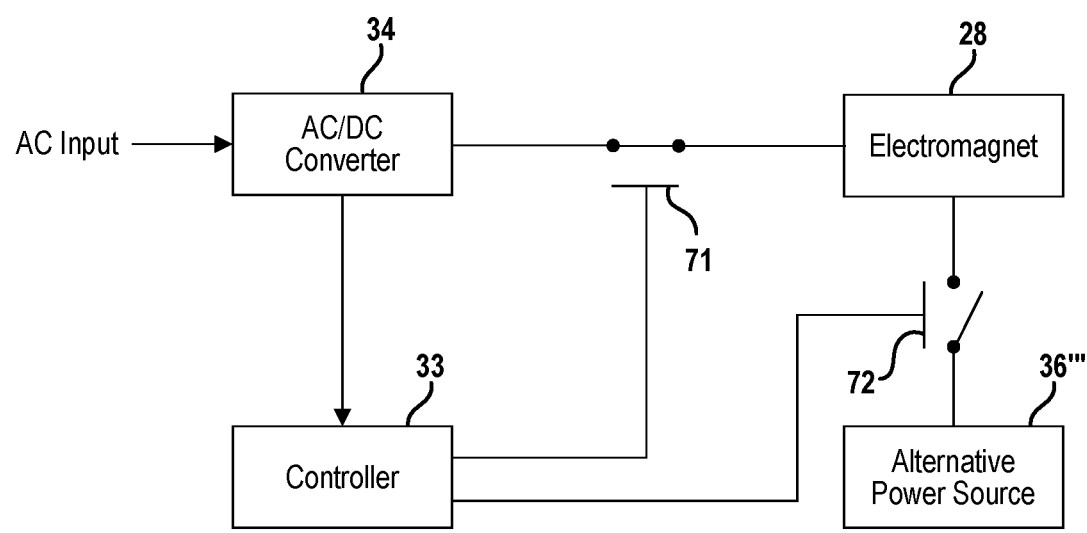
FIG. 7 is a block diagram of yet another example embodiment of a drill press.

FIG. 7 illustrates another alternative arrangement of components for the drill press. In this arrangement, the controller 33 monitors the presence and integrity of the AC input signal and controls one of two switches: first switch 71 or second switch 72. The controller 33 may monitor the presence AC input signal directly or indirectly by sensing the characteristic of the current consumed during operation of the electromagnet or the electromagnetic field generated by the electromagnet. First switch 71 is interposed between the AC/DC converter 34 and the electromagnet 28; whereas, second switch 72 is interposed between the alternate power source 36''' and the electromagnet 28.

When the controller 33 detects the presence of the AC input signal, first switch 71 is closed and second switch 72 is opened, thereby supplying the energizing signal from the AC/DC converter 34 to the electromagnet 28. When the AC input signal is interrupted, the controller 33 opens first switch 71 and closes second switch 72, thereby supplying the energizing signal from the alternate power supply 36''' to the electromagnet 28. In this way, the controller 33 actively controls the energizing of the electromagnet. This arrangement otherwise operates in the manner as set forth above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A magnetic drill, comprising:
a housing with a base configured to attach to a planar surface;
an electromagnet arranged in the base of the housing and operable, in response to a DC voltage, to magnetically couple the base to a surface proximate to the base;
an electric motor for driving a tool;
a converter configured to receive an AC input signal and, in the presence of the AC input signal, to output a DC voltage;
a controller configured to receive the DC voltage from the converter and operable to energize the electromagnet; and
an alternate power source circuit that monitors the DC voltage output by the controller using a detector and, in the absence thereof, provides an alternate DC voltage to the electromagnet.

2. The magnetic drill of claim 1 further comprises a switch for powering on and off the motor, wherein the switch having at least two terminals placed in series with the converter.

3. The magnetic drill of claim 1 wherein the controller determines a number of occurrences or an amount of time when the battery is energizing the electromagnet and generates a notification when the number of occurrences of the amount of time exceeds a predefined threshold.

4. The magnetic drill of claim 1 wherein the detector generates a user perceptible alert when the battery is electrically coupled to the electromagnet.

5. The magnetic drill of claim 1 wherein the controller determines a number of occurrences or an amount of time when the battery is energizing the electromagnet and generates a notification when the number of occurrences of the amount of time exceeds a predefined threshold.

6. The magnetic drill of claim 2 wherein the detector further comprises a first diode interposed between the converter and the electromagnet.

7. The magnetic drill of claim 6 wherein the alternate power source circuit includes a battery.

8. The magnetic drill of claim 7 wherein the detector monitors the DC voltage output by the controller and electrically couples the battery to the electromagnet in the absence of a DC voltage output from the converter.

9. The magnetic drill of claim 8 wherein the detector is further defined as a second diode having a cathode electrically coupled to a node interposed between the first diode and the electromagnet.

10. A magnetic drill, comprising:
a housing with a base configured to attach to a planar surface;
an electromagnet arranged in the base of the housing and operable, in response to a DC voltage, to magnetically couple the base to a surface proximate to the base;
an electric motor for driving a tool;
a converter configured to receive an AC input signal and, in the presence of the AC input signal, to output a DC voltage;
a controller configured to receive the DC voltage from the converter and operable to energize the electromagnet;
a first diode interposed between the converter and the controller; and
an alternate power source circuit having a battery coupled in series with a second diode, wherein the second diode is forward biased in an absence of the AC input signal across the first diode and thereby electrically couples the battery to the electromagnet, the second diode having a cathode electrically coupled to a node and the node is interposed between the controller and the electromagnet.

11. The magnetic drill of claim 10 further comprises a switch for powering on and off the motor, wherein the switch having at least two terminals placed in series with the converter.

12. The magnetic drill of claim 10 further comprises a charging circuit configured to receive the AC input signal and maintain charge of the battery.

13. The magnetic drill of claim 10 wherein the detector generates a user perceptible alert when the battery is electrically coupled to the electromagnet.

14. The magnetic drill of claim 10 wherein the controller is configured to monitor the battery and generate a notification to replace the battery based on condition of the battery.

15. The magnetic drill of claim 10 wherein the controller determines a number of occurrences or an amount of time when the battery is energizing the electromagnet and generates a notification when the number of occurrences of the amount of time exceeds a predefined threshold.

* * * * *